(12) United States Patent
Winand

(10) Patent No.: US 11,543,156 B2
(45) Date of Patent: Jan. 3, 2023

(54) SOLAR RECEIVER INSTALLATION WITH PRESSURIZED HEAT TRANSFER FLUID SYSTEM

(71) Applicant: COCKERILL MAINTENANCE & INGENIERIE S.A., Seraing (BE)

(72) Inventor: Stephane Winand, Angleur (BE)

(73) Assignee: JOHN COCKERILL S.A., Seraing (BE)

( * ) Notice: Subject to any disclaimer, the term of this patent is extended or adjusted under 35 U.S.C. 154(b) by 229 days.

(21) Appl. No.: 16/969,575

(22) PCT Filed: Jan. 23, 2019

(86) PCT No.: PCT/EP2019/051552
§ 371 (c)(1),
(2) Date: Aug. 13, 2020

(87) PCT Pub. No.: WO2019/158325
PCT Pub. Date: Aug. 22, 2019

(65) Prior Publication Data
US 2021/0010717 A1    Jan. 14, 2021

(30) Foreign Application Priority Data

Feb. 16, 2018   (EP) ..................................... 18157089

(51) Int. Cl.
*F24S 40/53*    (2018.01)
*F24S 40/58*    (2018.01)
(Continued)

(52) U.S. Cl.
CPC ............... *F24S 40/53* (2018.05); *F24S 20/20* (2018.05); *F24S 80/20* (2018.05)

(58) Field of Classification Search
CPC .... B01D 2279/35; B01D 45/04; B01D 45/06; B01D 51/06; B01D 51/10; B01D 2201/20; B01D 45/12; F16L 55/24
See application file for complete search history.

(56) References Cited

U.S. PATENT DOCUMENTS 3,438,722 A    4/1969  Heredy et al.
4,982,050 A *  1/1991  Gammie .................. C10L 3/10
                                                          585/818
(Continued)

FOREIGN PATENT DOCUMENTS

AT        505750 A4 *  4/2009  ............. B01D 45/16
AT        505750 B1    4/2009
(Continued)

*Primary Examiner* — Edelmira Bosques
*Assistant Examiner* — Emily Marie Kopp
(74) *Attorney, Agent, or Firm* — Leydig, Voit & Mayer, Ltd.

(57) ABSTRACT

A solar receiver heat transfer pressurized fluid system includes: a pressure relief valve; and a trapping device for separating liquid droplets from a pressurized gas released by the pressure relief valve and to capture the liquid droplets. The trapping device includes: a horizontal pipe; a liquid trap element extending from the horizontal pipe for catching separated liquid droplets; and a vertical exhaust pipe connected to the horizontal pipe substantially in a perpendicular manner and having an open end for discharging in atmosphere the pressurized gas released by the pressure relief valve. The horizontal pipe includes a first connection means for removably connecting at a first end to the pressure relief valve and a second connection means for removably connecting at a second end to the liquid trap element. The vertical exhaust pipe is connected to the horizontal pipe between the first end removably connectable to the pressure relief valve.

12 Claims, 6 Drawing Sheets

(51) Int. Cl.
  *F24S 20/20* (2018.01)
  *B01D 45/06* (2006.01)
  *F24S 80/20* (2018.01)

(56) References Cited

U.S. PATENT DOCUMENTS

| | | | | |
|---|---|---|---|---|
| 5,370,720 | A | * | 12/1994 | Duncan .................. B03C 3/014 |
| | | | | 96/361 |
| 5,398,914 | A | * | 3/1995 | Gay ........................ A62D 3/32 |
| | | | | 266/200 |
| 6,701,711 | B1 | | 3/2004 | Litwin |
| 2003/0172811 | A1 | | 9/2003 | Johnson |
| 2011/0038772 | A1 | | 2/2011 | Aichinger et al. |
| 2013/0056081 | A1 | | 3/2013 | Wortmann et al. |
| 2013/0247763 | A1 | * | 9/2013 | Forbes ............... B01D 19/0063 |
| | | | | 96/168 |
| 2018/0023421 | A1 | | 1/2018 | Wortmann et al. |
| 2018/0112929 | A1 | | 4/2018 | Wortmann et al. |

FOREIGN PATENT DOCUMENTS

| | | | | |
|---|---|---|---|---|
| CN | 1247879 C | * | 3/2006 | ........... F01D 25/007 |
| CN | 201066013 Y | | 5/2008 | |
| CN | 206420172 U | * | 8/2017 | |
| DE | 102008038733 A1 | | 3/2010 | |
| DE | 102010039813 A1 | | 3/2012 | |
| DE | 102012023682 A1 | | 6/2014 | |
| DE | 102012023682 A1 | * | 6/2014 | ............. B01D 45/06 |
| EP | 2332626 A2 | | 6/2011 | |
| FR | 660282 A | | 7/1929 | |
| GB | 677289 A | | 8/1952 | |
| GB | 677289 A | * | 8/1952 | ............. F16L 55/24 |
| JP | S 5684614 A | | 7/1981 | |
| JP | S 56144720 A | | 11/1981 | |
| JP | S 6122517 U | | 2/1986 | |
| JP | 2007032710 A | * | 2/2007 | |
| JP | 2007188641 A | * | 7/2007 | |
| JP | 2013199926 A | | 10/2013 | |
| JP | 2013199926 A | * | 10/2013 | |
| SU | 1766466 A1 | | 10/1992 | |
| WO | WO-2006087517 A1 | * | 8/2006 | ............. B01D 45/06 |
| WO | WO 2014014193 A1 | | 1/2014 | |
| WO | WO-2014039641 A2 | * | 3/2014 | ............... G21C 1/22 |
| WO | WO 2014039641 A2 | | 3/2014 | |
| WO | WO 2016184961 A1 | | 11/2016 | |

* cited by examiner

SOLAR RECEIVER INSTALLATION WITH PRESSURIZED HEAT TRANSFER FLUID SYSTEM

CROSS-REFERENCE TO PRIOR APPLICATIONS

This application is a U.S. National Phase application under 35 U.S.C. § 371 of International Application No. PCT/EP2019/051552, filed on Jan. 23, 2019, and claims benefit to European Patent Application No. EP 18157089.6, filed on Feb. 16, 2018. The International Application was published in English on Aug. 22, 2019 as WO 2019/158325 under PCT Article 21(2).

FIELD

The present invention is related to a trapping system for hot molten salt droplets ejected from an over-pressurized system, suitable to be used in a solar receiver installation having molten salt as a thermal transfer fluid where such droplets ejection is to be avoided.

BACKGROUND

In the CSP solar receiver tower technology, the heat transfer fluid is often used a molten salt typically entering at 290° C. into the solar receiver tubes and coming out thereof at 565° C.

A pressure relief valve (PRV) has to be used in order to avoid air overpressure in the molten salt inlet and outlet tanks. In case of overpressure, the PRV opens and the air goes out into the atmosphere. Moreover, some hot molten salt droplets can be carried away with the air flowing out to the atmosphere.

These hot molten salt droplets may cause problems and even danger for humans and equipment. Currently, it is challenging to provide a technology for avoiding these molten salt projections. No equipment is known or planned in the current art to overcome this particular and acute problem.

Document U.S. Pat. No. 6,701,711 B1 discloses an air separator provided on a receiver heat exchanger of a solar power plant. At the outlet of the heat exchanger, the air separator, being a typical T-shaped separator, removes air entrained in the flow of molten salt provided through the receiver. The air separator has an inlet downstream of the receiver heat exchanger and an outlet connected to a hot storage tank by way of downcomer, supplying the flow of molten salt to this hot storage tank. The air separator is also connected to another pipe belonging to a running vent system, in order to release the air entrained in the molten salt flow from the heat exchanger. The system also includes a pressure relief valve connected to a molten salt holding vessel.

Document US 2013/0056081 A1 relates to a pipeline system for conveying a salt melt comprising a relief valve able to remove inert gases from the solar melt. To this end, a phase separator is provided in addition to the relief valve. In the phase separator, the gas is separated from the salt melt and can be then removed through the relief valve.

Document U.S. Pat. No. 3,438,722 A relates to a process for the removal of sulfur compounds from hot combustion gases. A flue gas is admitted by way of a conduit to an absorber unit, ordinarily consists of five stainless steel cyclone spray towers in parallel arrangement, the towers being suitably insulated. The flue gas enters tangentially at the base of absorber and travels upwardly with a velocity of about 20 ft./sec. It is contacted countercurrently by a spray of molten carbonate which is discharged through a spray distributor located above the base of the absorber tower. After contacting the molten carbonate spray, the desulfurized flue gas flows past distributor into a wire demister, which is located in the upper section of the absorber tower. The demister serves to remove entrained salt-containing droplets from the flue gas.

Document WO 2014/039641 A2 discloses a molten salt nuclear reactor incorporating heat exchangers that are used to transfer heat from the primary loop, which contains the molten fuel salt, to a secondary loop. In a molten salt reactor, it is possible from tritium present in fuel salt to migrate across the heat exchanger leading to tritium contamination of the secondary loop. In this document, a cover gas system is included in the reactor vessel, used to adjust the system pressure and to act as a pressure relief valve in accident scenarios or other scenarios or applications. A demister separates the cover gas region from the molten salt, consisting of a pipe or set of pipes packed with a dense metal mesh, wire, or other configuration. The metal forming the mesh, wire, or other configuration may be a steel alloy with a high nickel content.

Document JP 2013-199926 A aims to provide a scale collector that can prevent trouble of a turbine or a drain line by separating a scale mixed in a steam line with a simple structure, and to provide a boiler with the scale collector. The scale collector provided in steam piping in which steam flows and collecting scale includes: a steam entrance part that guides the steam from a horizontal direction; a collecting part that is provided in an extended line in a flow direction of the steam guided from the steam entrance part and blocks the steam and collects the scale; and a steam outlet that is provided between the steam entrance part and the collecting part and flows out the steam in a direction where the steam is turned with respect to the extended line.

Document JP S56-144720 A aims at eliminating an influence of heat strain, to reduce pressure loss and to improve efficiency by utilizing a fact that the orbits of a gas and a dust is parted at a bent part of a pipe line from difference of a specific gravity there between. The dust removing apparatus is constituted from a pipe line having a bent part, a communicating pipe protruded on an extension line of a straight pipe part, a dust receiving device connected to a downward vertical part of the communicating pipe, a dust discharge pipe for taking out the dust accumulated in the dust receiving device and a normally opened valve. An inner diameter d1 of the aforementioned communicating pipe is set against an inner diameter d0 of the pipe line so as to satisfy a formula $0.35 <= d1/d0 <= 0.8$ and, further, a cross area of the dust receiving device is set to two times or more larger than a cross area of the communicating pipe. As a result, when a gas stream passing through the communicating pipe is entered into the dust receiving device, a flow speed thereof is reduced in an inversely proportional relation against a cross area of the communicating pipe and the dust receiving device, the accumulated dust is not returned to the pipe passage.

SUMMARY

In an embodiment, the present invention provides a solar receiver heat transfer pressurized fluid system, comprising: a pressure relief valve; and a trapping device configured to separate liquid droplets from a pressurized gas released by the pressure relief valve and to capture the liquid droplets, the trapping device comprising: a horizontal pipe; a liquid trap element extending from the horizontal pipe and configured to catch separated liquid droplets; and a vertical exhaust pipe connected to the horizontal pipe substantially in a perpendicular manner and having an open end configured to discharge in atmosphere the pressurized gas released by the pressure relief valve, wherein the horizontal pipe comprises a first connection means configured to removably connect at a first end to the pressure relief valve and a second connection means configured to removably connect at a second end to the liquid trap element, and wherein the vertical exhaust pipe is connected to the horizontal pipe between the first end removably connectable to the pressure relief valve and the second end removably connectable to the liquid trap element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a trapping system for avoiding ejection of hot molten salt flow or droplets in the atmosphere.

In an embodiment, the system is designed to catch at least all molten salt droplets that cannot be cooled down to 50° C. after 200 meter in free fall, in the case of a CSP solar receiver tower plant.

In an embodiment, the present invention also provides a system for catching molten salt droplets of at least 0.25 mm diameter.

A first aspect of the present invention relates to a solar receiver heat transfer pressurized fluid system equipped with a relief valve and a trapping device for separating liquid droplets from a pressurized gas released by the pressure relief valve and for capturing said liquid droplets, said trapping device comprising, in use:

a horizontal pipe;
a liquid trap element extending from the horizontal pipe and capable to catch the separated liquid droplets;
a vertical exhaust pipe connected to the horizontal pipe substantially in a perpendicular manner and having an open end for discharging in the atmosphere the gas released by the pressure relief valve;

the horizontal pipe being provided by a first connection means for removably connecting at a first end to the pressure relief valve and by a second connection means for removably connecting at a second end to the liquid trap element, the vertical exhaust pipe being connected to the horizontal pipe between the first end removably connectable to the pressure relief valve and the second end removably connectable to the liquid trap element.

According to further embodiments of the invention, the solar receiver heat transfer pressurized fluid system is further limited by one of the following features or by a suitable combination thereof:

the vertical exhaust pipe is connected forming a bend to the horizontal pipe;
the vertical exhaust pipe has a length of at least 0.5 m;
the ratio of the length of the horizontal pipe by the length of the liquid trap element is comprised between 2 and 6;
the ratio length/diameter of the liquid trap element is comprised between 1.5 and 6;
the liquid trap element comprises a cap enclosing a wire mesh capable to capture the separated liquid droplets;
the wire mesh is made of stainless steel, with a wire diameter comprised between 0.15 mm to 0.35 mm, and with a packing density comprised between 100 and 250 kg/m$^3$;
the wire mesh is made of 304L- or 316L-grade stainless steel;
the wire mesh is maintained inside the cap by a wire mesh holder;
the heat transfer fluid is a molten salt or a mixture of molten salts, liquid sodium or thermal oil and wherein the pressurized gas is air.

A second aspect of the present invention concerns a concentrated solar power plant or CSP, preferably of the solar receptors-supporting tower type, comprising a solar receiver heat transfer pressurized fluid system as described above.

Figure 1:
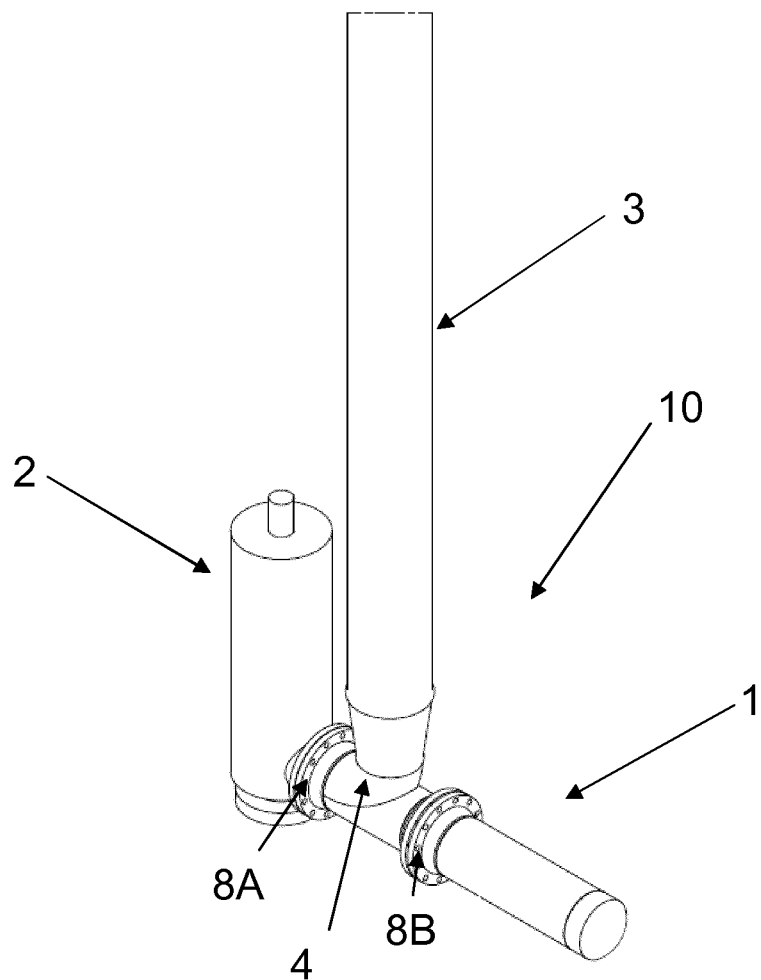
FIG. 1 is a perspective view of one embodiment for a salt trapping device according to the invention, which is connected to a pressure relief valve.
Figure 2:
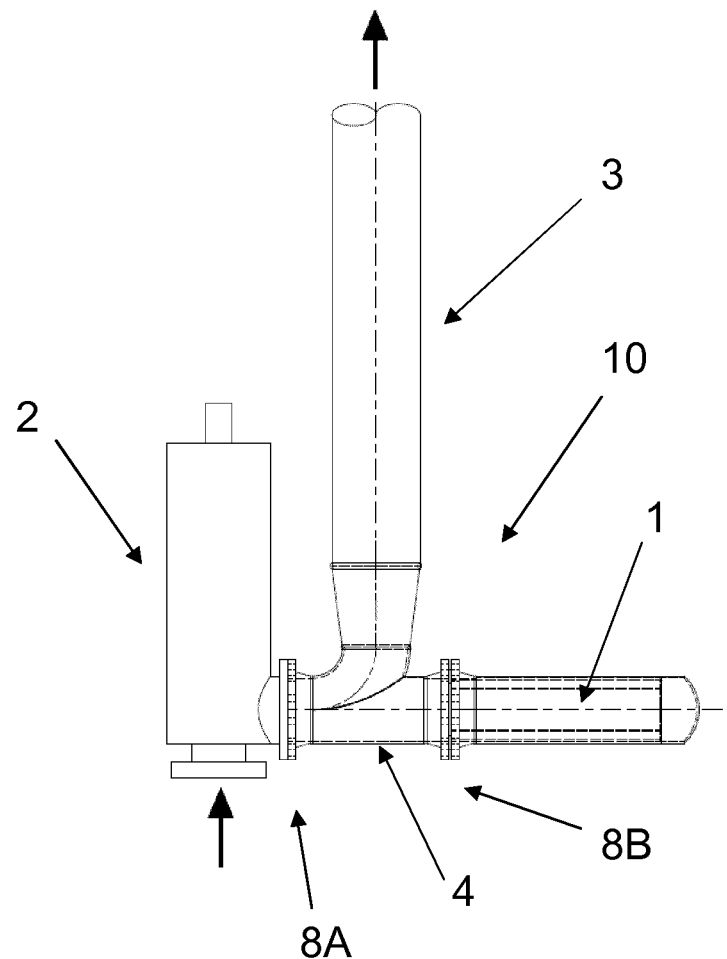
FIG. 2 is an elevation view of the salt trapping device of FIG. 1, connected to the pressure relief valve.
Figure 3:
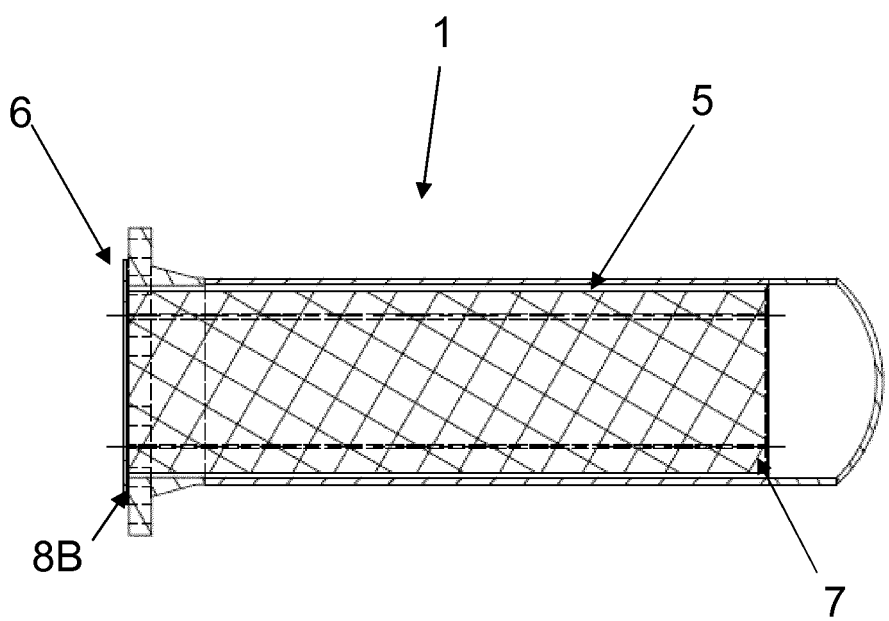
FIG. 3 represents a detailed cross-sectional view of the salt tap element of the salt trapping device according to the invention.

The present invention relates to a solar receiver heat transfer pressurized fluid system equipped with molten salt trapping device as illustrated by FIG. 1. The salt trapping device comprises a salt trap element 1 extending from a horizontal pipe 4 at one end thereof, and a vertical exhaust pipe 3 freely open to the atmosphere and connected substantially perpendicularly to the horizontal pipe 4. The salt trapping device is designed to be connected to a pressure relief valve 2, by attaching the horizontal pipe 4 to the pressure relief valve 2 but at its end opposite the salt trap element 1.

Preferably the salt trap element 1 is composed of a cap 7 having in its interior a wire mesh 5 maintained by a wire mesh holder 6. The wire mesh 5 is preferably made of stainless steel, preferably 304L or 316L (molybdenum stainless steel), with a wire diameter comprised between 0.15 mm to 0.35 mm, and preferably of 0.28 mm, as well as with a packing density comprised between 100 and 250 kg/m$^3$, and preferably of 140 kg/m$^3$. The other parts of the device are also preferably made of stainless steel.

The working principle of the trapping device is based on a quick change of the air flow direction. The mixed flow of molten salt droplets and pressurized air comes from the pressure relief valve 2 at the entrance of the molten salt droplets trapping system. Thanks to the difference of density between the two fluids, the molten salt droplets will go by inertia into the horizontal pipe 4 and will be separated from the air flow which is released in the vertical pipe 3. The molten salt droplets will then be captured in the wire mesh 5 of the salt trap element 1. The air will flow into the atmosphere at the open end of the exhaust pipe 3.

For an optimal running, the length of the horizontal pipe 4 is comprised between 2 and 3 m.

Preferably, the minimal length of the vertical exhaust pipe 3 is comprised between 0.5 and 1 m.

In a preferred embodiment, the salt trap element 1 has a length comprised between 0.75 and 1.50 m and a diameter comprised between 25 and 50 cm.

EXAMPLE

Figure 4:
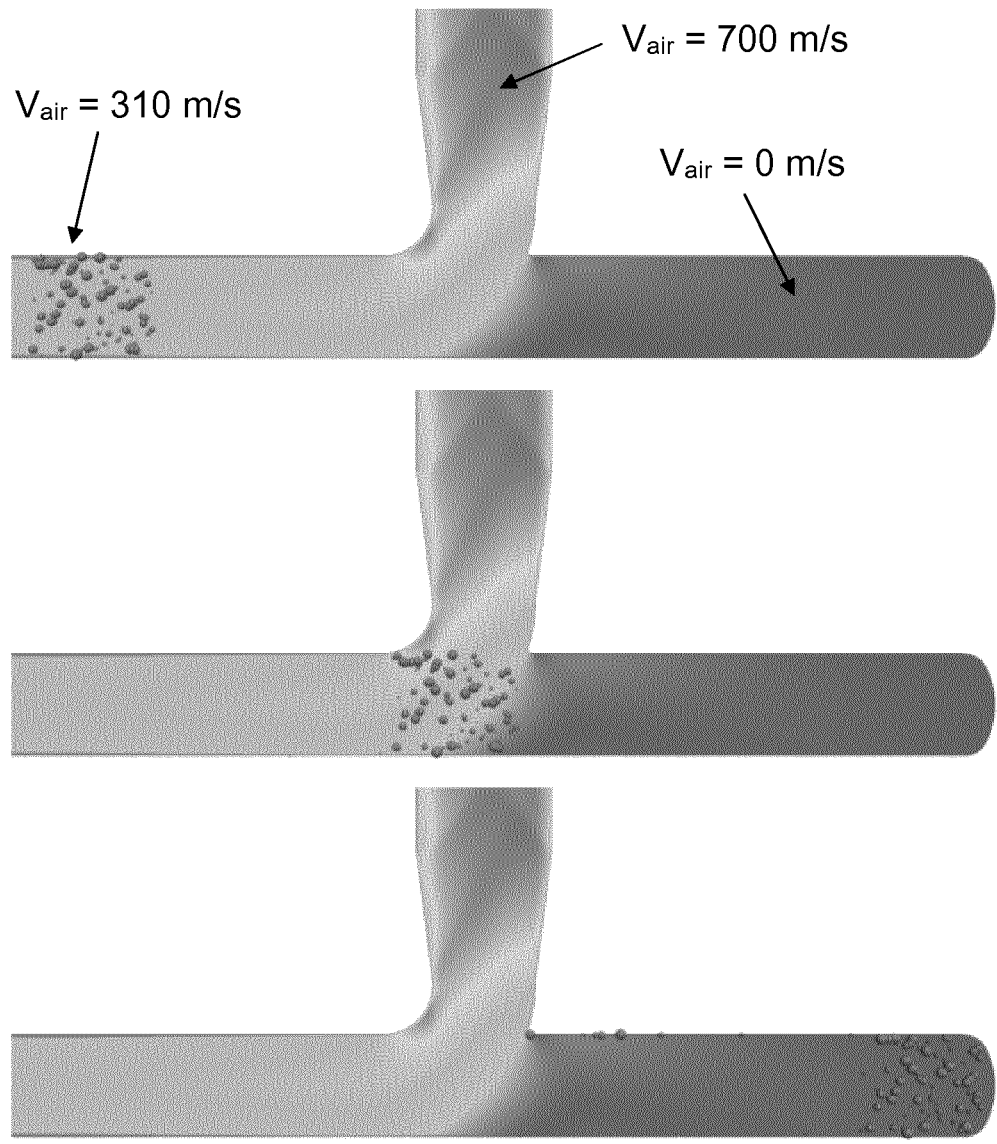
FIGS. 4 and 5 illustrate results of numeric simulations where molten salt particles are injected randomly onto the input line of a computational domain modeling the salt trap of the present invention (cases B and E respectively corresponding to a number of input droplets equal to 100). The speed of the air flow is indicated in three regions of the salt trap device.
Figure 5:
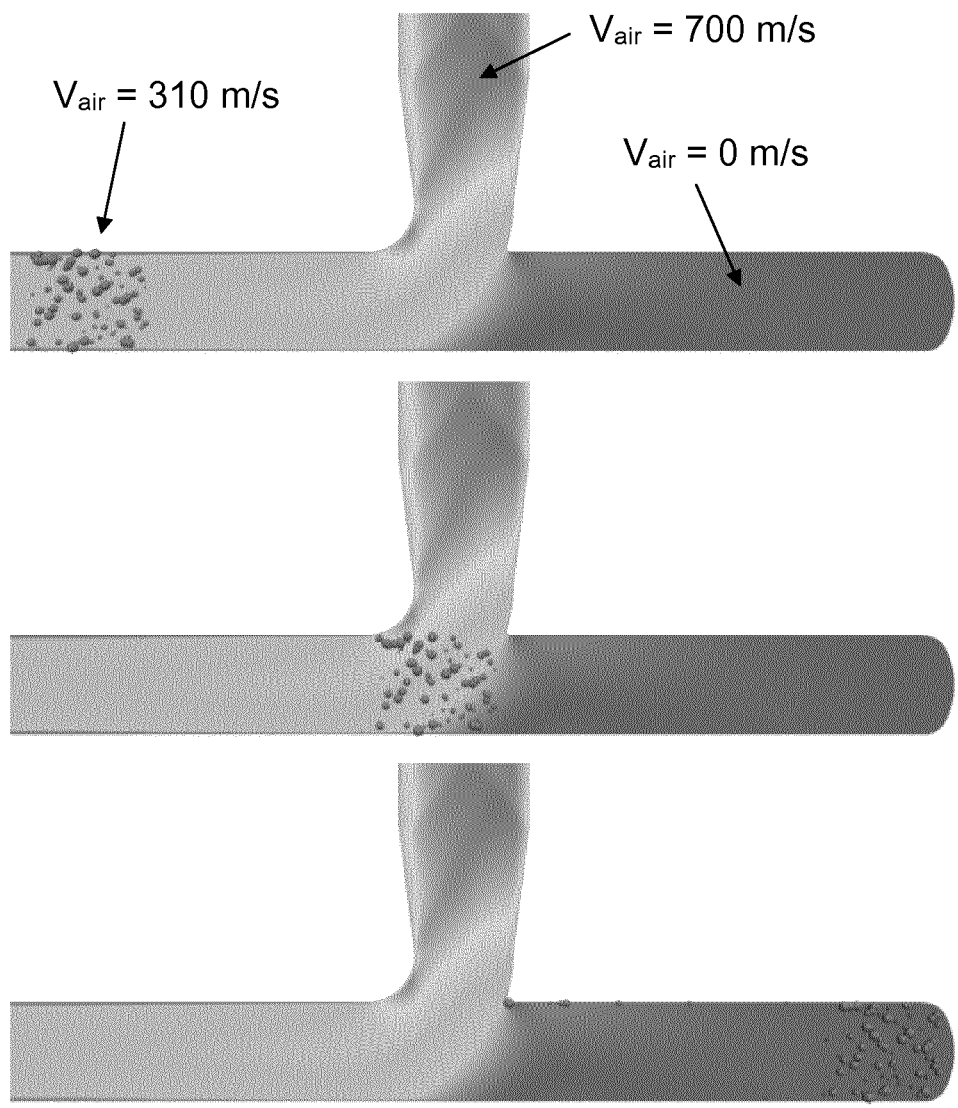
Figure 6:
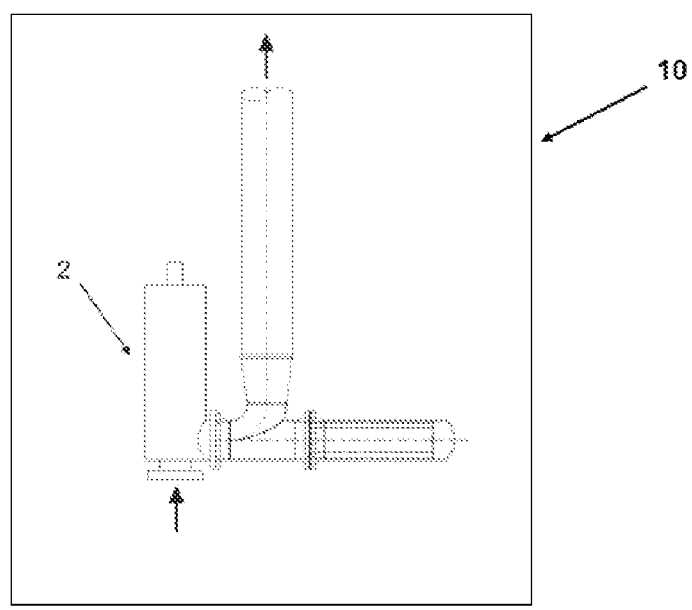
FIG. 6 shows a concentrated solar power plant or CSP / solar-receptors supporting tower.

FIGS. 4 and 5 illustrate results of different simulations performed for the device according to the present invention. In these simulations, molten salt particles are assumed injected randomly onto the input line of a computational domain modeling the salt trap (the simulation conditions have also been subject to certain geometric and physical assumptions). In this digital model, the injection of the molten salt particles takes place when the flow of air is established in stationary mode. Particles are subject to pressure forces (drag), gravity and inertia forces. They have an initial velocity equal to the speed of the air at the entry of the domain and a direction aligned with the axis of the pipe (supposed to be about 309 m/s).

The size of the molten salt particles is comprised between 0.25 and 6 mm diameter. The density and the number of particles has been varied according to 6 different configurations, as shown in Table 1.

TABLE 1

| Injection | A | B | C | D | E | F |
|---|---|---|---|---|---|---|
| Temperature [° C.] | 242 | 242 | 242 | 494 | 494 | 494 |
| Density [kg/m$^3$] | 1936 | 1936 | 1936 | 1776 | 1776 | 1776 |
| Quantity [—] | 20 | 100 | 200 | 20 | 100 | 200 |

The properties of the air at the outlet of the valve are shown in Table 2, and the thermal properties of the molten salt are shown in Table 3.

TABLE 2

| | Air |
|---|---|
| Temperature [° C.] | 242.1 |
| Viscosity | Sutherland's law |
| Speed [m/s] | 310 |
| Prandtl No. | 0.72 |

TABLE 3

| | T inlet 242° C. | T outlet 494° C. |
|---|---|---|
| Density [kg/m$^3$] | 1936 | 1776 |

The results are illustrated in FIGS. 4 and 5, respectively representing cases B and E, with 100 molten salt droplets. The results show that the density and number of the droplets has only a marginal influence on the working of the trapping device. It is the inertia of the droplets (310 m/s) which gives them a rectilinear trajectory. The latter is very little influenced by the air flow lines and by the gravity.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

1 Salt trap element
2 Pressure relief valve
3 Vertical exhaust pipe
4 Horizontal pipe
5 Wire mesh
6 Wire mesh holder
7 Cap
8A, 8B Connection means
10 Concentrated solar power plant/Solar-receptors supporting tower

The invention claimed is:

1. A solar receiver heat transfer pressurized fluid system, comprising:
a pressure relief valve; and
a trapping device configured to separate liquid droplets from a pressurized gas released by the pressure relief valve and to capture the liquid droplets, the trapping device comprising:
a horizontal pipe;
a liquid trap element extending from the horizontal pipe and configured to catch separated liquid droplets; and
a vertical exhaust pipe connected to the horizontal pipe substantially in a perpendicular manner and having an open end configured to discharge in atmosphere the pressurized gas released by the pressure relief valve,
wherein the horizontal pipe comprises a first connection means configured to removably connect at a first end to the pressure relief valve and a second connection means configured to removably connect at a second end to the liquid trap element, and
wherein the vertical exhaust pipe is connected to the horizontal pipe between the first end removably connectable to the pressure relief valve and the second end removably connectable to the liquid trap element.

2. The system according to claim 1, wherein the vertical exhaust pipe forms a bend to the horizontal pipe.

3. The system according to claim 1, wherein the vertical exhaust pipe has a length of at least 0.5 m.

4. The system according to claim 1, wherein a ratio of a length of the horizontal pipe to a length of the liquid trap element is between 2 and 6.

5. The system according to claim 1, wherein a ratio of length/diameter of the liquid trap element is between 1.5 and 6.

6. The system according to claim 1, wherein the liquid trap element comprises a cap enclosing a wire mesh configured to capture the separated liquid droplets.

7. The system according to claim 6, wherein the wire mesh is comprised of stainless steel, with a wire diameter of between 0.15 mm to 0.35 mm, and with a packing density of between 100 and 250 kg/m$^3$.

8. The system according to claim 7, wherein the wire mesh is comprised of 304L- or 316L-grade stainless steel.

9. The system according to claim 6, wherein the wire mesh is maintained inside the cap by a wire mesh holder.

10. The system according to claim 1, wherein the heat transfer fluid comprises a molten salt or a mixture of molten salts, liquid sodium, or thermal oil, and
   wherein the pressurized gas comprises air.

11. A concentrated solar power plant or CSP, comprising:
   the solar receiver heat transfer pressurized fluid system according to claim 1.

12. The concentrated solar power plant or CSP according to claim 11, wherein the concentrated solar power plant or CSP comprises a solar receptors-supporting tower concentrated solar power plant or CSP.

\* \* \* \* \*